(12) United States Patent
Hyytia et al.

(10) Patent No.: US 9,609,088 B2
(45) Date of Patent: *Mar. 28, 2017

(54) METHOD FOR DELIVERY OF MESSAGES IN A COMMUNICATION SYSTEM

(71) Applicant: Core Wireless Licensing S.a.r.l., Luxembourg (LU)

(72) Inventors: Simo Hyytia, Espoo (FI); Janos Kovacs, Lahela (FI); Zoltan Kis, Espoo (FI); Krisztian Litkey, Espoo (FI)

(73) Assignee: CORE WIRELESS LICENSING S.A.R.L., Luxembourg (LU)

( * ) Notice: Subject to any disclaimer, the term of this patent is extended or adjusted under 35 U.S.C. 154(b) by 22 days.

This patent is subject to a terminal disclaimer.

(21) Appl. No.: 13/633,214

(22) Filed: Oct. 2, 2012

(65) Prior Publication Data

US 2013/0094443 A1    Apr. 18, 2013

Related U.S. Application Data

(63) Continuation of application No. 11/604,842, filed on Nov. 28, 2006, now Pat. No. 8,311,046.

(51) Int. Cl.
| | |
|---|---|
| *H04W 4/12* | (2009.01) |
| *H04L 29/06* | (2006.01) |
| *H04L 12/701* | (2013.01) |
| *H04L 29/08* | (2006.01) |

(52) U.S. Cl.
CPC .............. *H04L 69/18* (2013.01); *H04L 45/00* (2013.01); *H04L 67/24* (2013.01); *H04L 67/303* (2013.01); *H04W 4/12* (2013.01)

(58) Field of Classification Search
CPC .......... H04L 29/06; H04L 69/40; H04W 4/12; H04W 4/14
See application file for complete search history.

(56) References Cited

U.S. PATENT DOCUMENTS

| | | | |
|---|---|---|---|
| 6,101,545 A | 8/2000 | Balcerowski et al. | |
| 7,089,003 B2 | 8/2006 | Fingerhut et al. | |
| 7,342,892 B2* | 3/2008 | Soon et al. | 370/244 |
| 7,653,191 B1* | 1/2010 | Glasser et al. | 379/201.1 |

(Continued)

FOREIGN PATENT DOCUMENTS

| | | |
|---|---|---|
| WO | 02/05507 A2 | 1/2002 |
| WO | 2004/006595 A1 | 1/2004 |

(Continued)

*Primary Examiner* — David Oveissi
(74) *Attorney, Agent, or Firm* — Core Wireless Licensing Ltd.

(57) ABSTRACT

The invention relates to a method in which a message is received to a communication server from a node. The communication server obtains user information with recipient information in the message. The user information comprises user entity state and user entity protocol information. A first protocol is determined to become a preferred protocol based on the user entity protocol information. The delivery of said message is attempted with a delivery mechanism of the preferred protocol. A second protocol is determined to become the preferred protocol with said user entity protocol information upon a failure to deliver said message with said first protocol. The attempting of the delivery of said message is repeated with a delivery mechanism of the preferred protocol.

17 Claims, 8 Drawing Sheets

(56) References Cited

U.S. PATENT DOCUMENTS

| | | | |
|---|---|---|---|
| 7,797,306 B1 * | 9/2010 | Pather et al. ................. | 707/714 |
| 2003/0023691 A1 | 1/2003 | Knauerhase | |
| 2003/0174731 A1 | 9/2003 | Tafazolli et al. | |
| 2004/0006601 A1 | 1/2004 | Bernstein et al. | |
| 2004/0199649 A1 * | 10/2004 | Tarnanen et al. ............. | 709/230 |
| 2006/0224750 A1 * | 10/2006 | Davies et al. ................ | 709/229 |

FOREIGN PATENT DOCUMENTS

| | | | |
|---|---|---|---|
| WO | 2004/008716 | A2 | 1/2004 |
| WO | 2005/117469 | A1 | 12/2005 |

* cited by examiner

METHOD FOR DELIVERY OF MESSAGES IN A COMMUNICATION SYSTEM

BACKGROUND OF THE INVENTION

Field of the Invention

The invention relates to communication networks. Particularly, the invention relates to a method for the delivery of messages in a communication system.

Description of the Related Art

Recently, Internet service providers have introduced a wide range of communication applications. The communications applications are related to a gamut of communications needs. The applications may offer various features for messaging, tracking of the status information of users in the Internet, advertisements, alerts and content consumption. There exists a wide variety of standardized communication applications outside the traditional realms of browsing and electronic mail. Examples of such standardized applications include instant messaging and presence. However, there are numerous different standards. Often Internet service providers offer their own specific variants of these services. The adapting of these applications to a mobile communication system or to any other communication system that supports alternative protocols and message delivery mechanisms introduces challenges. The availability of a given message delivery mechanism or protocol may be dependent on the state of a user terminal or the network. User may also have different terminal equipments with different capabilities at their disposal. It may be difficult for a server to be informed of the varying conditions pertaining to the network and the user terminal.

Previously, the servers in communication with end-user terminals have used a given protocol and its message delivery mechanism for a given application. This fact introduces serious impediments for the use of the application. The application may be available sporadically depending on the network used, current status of the terminal pertaining to the use of other services and the network traffic conditions. For example, while a circuit switched call is active, a mobile station without Dual Transfer Mode (DTM) capability does not support the use of Internet Protocol (IP) based services. Some network may not support the simultaneous use of circuit switched and packet switched services. The varying conditions are often unobservable for a user. The availability of a service may appear random. Therefore, it would be beneficial to have a mechanism which ensures the availability of a given service in different conditions.

SUMMARY OF THE INVENTION

The invention relates to a method in which a message is received to a communication server from a node. The communication server obtains user information with recipient information in the message. The user information comprises user entity state and user entity protocol information. A first protocol is determined to become a preferred protocol based on the user entity protocol information. The delivery of said message is attempted with a delivery mechanism of the preferred protocol. A second protocol is determined to become the preferred protocol with said user entity protocol information upon a failure to deliver said message with said first protocol. The attempting of the delivery of said message is repeated with a delivery mechanism of the preferred protocol.

The invention relates also to a method comprising: receiving a message to a communication server from a node; obtaining user information with recipient information in said message, said user information comprising a user entity state and user entity protocol information; determining a first protocol to become a preferred protocol based on said user entity protocol information; attempting the delivery of said message with a delivery mechanism of said preferred protocol; determining a second protocol to become said preferred protocol with said user entity protocol information upon a failure to deliver said message with said first protocol; and repeating said attempting of the delivery of said message with a delivery mechanism of said preferred protocol.

The invention relates also to a system comprising: a communication server configured to receive a message from a node, to obtain user information with recipient information in said message, said user information comprising a user entity state and user entity protocol information, to determine a first protocol to become a preferred protocol based on said user entity protocol information, to attempt the delivery of said message with a delivery mechanism of said preferred protocol, to determine a second protocol to become said preferred protocol with said user entity protocol information upon a failure to deliver said message with said first protocol and to repeat said attempting of the delivery of said message with a delivery mechanism of said preferred protocol.

The invention relates also to a network node comprising: a communication core entity configured to receive a message from a node, to obtain user information with recipient information in said message, said user information comprising a user entity state and user entity protocol information, to determine a first protocol to become a preferred protocol based on said user entity protocol information, to determine a second protocol to become said preferred protocol with said user entity protocol information upon a failure indication from a first protocol entity to deliver said message with said first protocol; said first protocol entity configured to attempt the delivery of said message with said preferred protocol; and a second protocol entity configured to repeat said attempting of the delivery of said message with said preferred protocol. Above, a protocol entity may mean a protocol stack implemented in software, or a hardware protocol implementation (port) or any combination of the two operative to provide a capability to communicate according to a certain protocol. Thus, a failure indication from such an entity may be, for example, an indication that no acknowledgement was received for a transmitted message.

The invention relates also to a network node comprising: means for receiving a message from a node; means for obtaining user information with recipient information in said message, said user information comprising a user entity state and user entity protocol information; means for determining a first protocol to become a preferred protocol based on said user entity protocol information; means for attempting the delivery of said message with a delivery mechanism of said preferred protocol; means for determining a second protocol to become said preferred protocol with said user entity protocol information upon a failure to deliver said message with said first protocol; and means for repeating said attempting of the delivery of said message with a delivery mechanism of said preferred protocol.

The invention relates also to a computer program comprising code adapted to perform the following steps when executed on a data-processing system: receiving a message from a node; obtaining user information with recipient information in said message, said user information comprising a user entity state and user entity protocol information;

determining a first protocol to become a preferred protocol based on said user entity protocol information; attempting the delivery of said message with a delivery mechanism of said preferred protocol; determining a second protocol to become said preferred protocol with said user entity protocol information upon a failure to deliver said message with said first protocol; and repeating said attempting of the delivery of said message with a delivery mechanism of said preferred protocol.

In one embodiment of the invention, the network node is a communication server for communicating with a client node which comprises the user entity as an application. The user entity state is the status of the application as observed via messages from the client node. The client node may be a mobile node. In the client node the user entity is determined, for example, from an application identifier field carried in the message. There may also be only one user entity in the client node.

In one embodiment of the invention, a delivery mechanism of a protocol comprises the sending of messages using the message types and message formats of the protocol and the method to relay the message to the destination. The method to relay the message may involve a number intermediate of nodes between a client node and the network node. The intermediate nodes may handle the message on different protocol layers.

In one embodiment of the invention, the recipient information comprises an identity of the user of the client node. The recipient information may be, for example, a Session Initiation Protocol (SIP) Uniform Resource Identifier (URI), an E-mail address or an MSISDN.

In one embodiment of the invention, the user entity for which user information is obtained in the network node is identified by the protocol used by the node to send the message. The user entity may also be explicitly identified in the message.

In one embodiment of the invention, the communication core entity or the second protocol entity in the network node is configured to detect the expiry of a time-to-live timer. The communication core entity is configured to detect a failure to deliver said message with said second protocol via said second protocol entity. The failure may be detected by way of an indication from the second protocol entity to the communication core entity in case the second protocol entity supervises the expiry of the time-to-live timer. As the communication core entity obtains information on the expiry of the value of said time-to-live parameter it sets said user entity state to offline. In other words, the time-to-live reaches zero. The time-to-live parameter may be set by the communication core entity to any value it considers appropriate under the circumstances of the dispatching of a message to a target node, via the second protocol entity.

In one embodiment of the invention, a mobile node allows a user to activate a user entity within the mobile node. The user entity may be, for example, a separate application within the mobile node. The mobile node allows said user to produce a message in said user entity, said producing comprising at least one of composing a message and selecting a user interface option offered by said user entity. The principle is that the user entity does not automatically upon its activation send a message to the network node. The mobile node sends said message to the network node which receives said message in a protocol entity. Upon detecting that said message originates from said user entity the communication core entity sets said user entity state to online.

In one embodiment of the invention, the communication core entity determines that said user entity state is offline. At a later time, the communication core entity or the second protocol entity stores a second message for delivery to a user entity. The second protocol entity attempts the delivery of said second message at least once. Upon receiving a delivery success report from the second protocol entity, the communication core entity sets said user entity state to online.

In one embodiment of the invention, the communication core entity starts a degrade timer upon being informed via the first or the second protocol entity of a failure to deliver said message. The communication core entity, the first protocol entity or the second protocol entity checks the success of the delivery of said message. The communication core entity is informed from either protocol entity of the success of the delivery of said message. The communication core entity sets the user entity state to "degraded" upon the expiry of said degrade timer and imposes to the first or the second protocol entity a limit on delivery attempts for messages to a user entity in response to said user entity state being degraded.

In one embodiment of the invention, the first and the second protocol entities are configured to communicate with a mobile network and said delivery mechanisms comprise the delivery of said message via at least one network entity within said mobile network.

In one embodiment of the invention, said first protocol comprises a transport protocol over the Internet Protocol. The Internet Protocol (IP) may be the IPv4 or the IPv6. A protocol entity using the first protocol comprises thus an IP protocol stack. The transport protocol may be the Transmission Control Protocol (TCP), the User Datagram Protocol (UDP), the Stream Control Transmission Protocol (SCTP) or Datagram Congestion Control Protocol (DCCP).

In one embodiment of the invention, said second protocol comprises the Short Message Service or the Unstructured Supplementary Service Data (USSD). The Short Message Service is, for example, the short message service from the GSM system or the UMTS system.

In one embodiment of the invention, the user entity protocol information comprises a protocol list of at least two protocols and a preference order of said at least two protocols. The preference order may be the order of the protocols in the list or separate information in association with the list.

In one embodiment of the invention, said mobile node is a mobile station and said second network comprises a mobile communication system.

In one embodiment of the invention, the system further comprises a protocol entity in the communication server, which is configured to deliver the message using the second protocol to a mobile node. The mobile node is configured to detect a protocol change condition, to detect that the first protocol is available and to send a response to the message from the mobile node using the first protocol. A protocol entity in the communication server is configured to receive the response to the message using the first protocol. The protocol change condition may comprise the receiving of a message from the communication server using the first protocol instead of the second protocol. The detecting of the availability of the first protocol may also comprise the receiving of a message from the communication server using the first protocol instead of the second protocol.

In one embodiment of the invention, the determining of a protocol to become a preferred protocol by the communication core entity further depends on additional factors. The additional factors comprise at least one of the size of said message, the urgency of said message and at least one security requirement for said message. For example, a logging on to a system with credentials might require a secure protocol, in other words, a secure channel such as SMS, Secure Hypertext Transfer Protocol (HTTPS) or UDP over IPsec, whereas a file transfer requires normal HTTP and is not allowed over SMS. Streaming voice requires UDP and is not allowed over SMS and other low bandwidth protocols or any reliable transport protocols. In one embodiment of the invention, a message requiring extreme reliability could specifically be sent over multiple parallel channels simultaneously.

In one embodiment of the invention, said system comprises a mobile communication network. In one embodiment of the invention, said mobile node comprises a mobile station or generally a mobile terminal. In one embodiment of the invention, the system comprises at least one of a Global System of Mobile Communications (GSM) network and a Universal Mobile Telephone System (UMTS) network. In one embodiment of the invention, the system comprises a Wireless Local Area Network (WLAN). In one embodiment of the invention, the system comprises also a Worldwide Interoperability for Microwave Access (WiMAX) network. In one embodiment of the invention, the mobile node may be, for example, a GSM mobile station or a UMTS mobile station with a dual mode or multimode functionality to support different access types.

In one embodiment of the invention, the computer program is stored on a computer readable medium. The computer readable medium may be a removable memory card, magnetic disk, holographic memory, optical disk or magnetic tape.

The embodiments of the invention described hereinbefore may be used in any combination with each other. Several of the embodiments may be combined together to form a further embodiment of the invention. A method, a system, a network node or a computer program to which the invention is related may comprise at least one of the embodiments of the invention described hereinbefore.

The benefits of the invention are related to improved availability of services, improved capability to send service related messages and better end user experience.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE EMBODIMENTS

Reference will now be made in detail to the embodiments of the present invention, examples of which are illustrated in the accompanying drawings.

Figure 1:
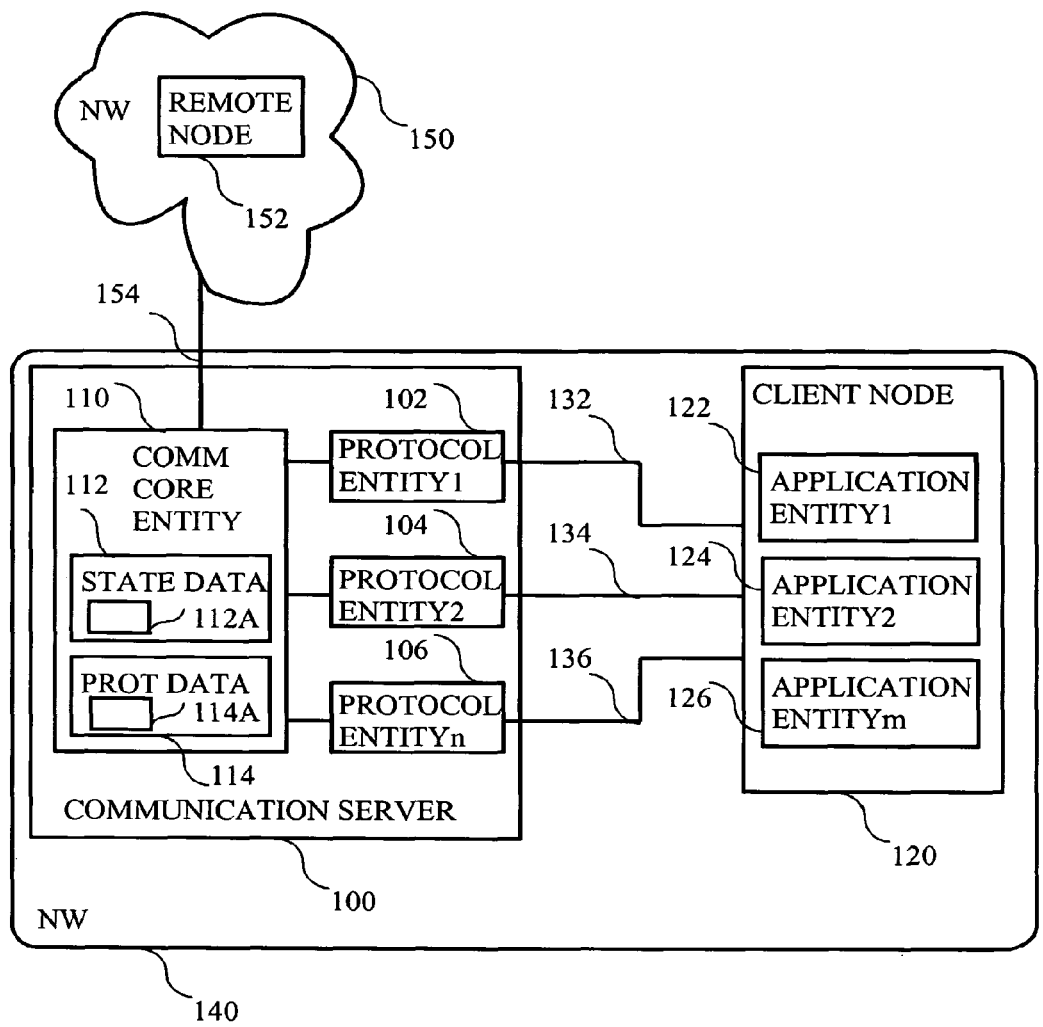
FIG. 1 is a block diagram illustrating a communication server in one embodiment of the invention.

FIG. 1 is a block diagram illustrating a communication server in one embodiment of the invention. In FIG. 1 there are illustrated two networks, namely a network 140 and a network 150. Network 150 represents a remote network. Network 150 comprises a remote node 152. There is a communication server 100 and a client node 120 in network 140. In FIG. 1 communication server 100 comprises a communication core entity 110, a protocol entity 102, a protocol entity 104 and a protocol entity 106. Within communication server 100 there may be at least one protocol entity, which is indicated with the letter N that stands for any natural number. The protocol entities 102, 104 and 106 are shown in FIG. 1 only by way of illustration and their number should not be understood as a number characteristic to this invention. Protocol entity 102 communicates with client node 120 using protocol 132. Protocol 104 communicates with client node 120 using protocol 134, and protocol entity 106 communicates with client node 120 using protocol 136. In FIG. 1 client node 120 comprises an application entity 122, an application entity 124 and an application entity 126. The application entities 122, 124 and 126 may be referred to as user entities. However, an application entity may implement more than one user entity. Within a client node there may be at least one application entity, which is indicated with letter M that stands for an arbitrary natural number. The application entities 122, 124 and 126 are shown in FIG. 1 only by way of illustration and their number should not be understood as a number characteristic to this invention. In one embodiment of the invention, an application entity comprising at least one user entity is an integral part of the software in client node 120.

Communication core entity 110 communicates with protocol entities 102, 104 and 106. When a protocol is used to communicate between a given protocol entity within communication server 100 and client node 120 there may be at least one intermediate node, which participates in the transmission of data between communication server 100 and client node 120. A given protocol entity applies a data delivery mechanism characteristic to the protocol. Examples of data delivery mechanisms for the purpose of transmitting a message from a protocol entity to client node 120 comprise a direct transmission mechanism, wherein the message is not stored when client node 120 is not reachable according to the terms of the protocol, and a store-and-forward mechanism, wherein a message may be kept stored, either in the protocol entity or in an intermediate node between communication server 100 and client node 120, while the delivery is not possible due to a state of client node 120. In both delivery mechanisms the delivery may be attempted a number of times.

Communication core entity 110 comprises state data 112 and protocol data 114. State data 112 and protocol data 114 are data structures. They are, for example, tables indexed with an identifier or a type of the user entity with which a message being processed is associated. State data 112 and protocol data 114 may be specific to a given client node such as client node 120. A client node may be identified with a user identity, which may be, for example, a Mobile Station ISDN (MSISDN) number or a Session Initiation Protocol Uniform Resource Identifier (SIP-URI). State data 112 comprises a user entity state for each user entity. In FIG. 1 state data 112 comprises at least a user entity state 112A for a given user entity, for example, application entity 122. The user entities are, for example, application entities within client node 120. Similarly, protocol data 114 stores user entity protocol data for each user entity. In FIG. 1 protocol data 114 comprises at least a user entity protocol data 114A for a given user entity, for example, application entity 124. A user entity state is related to the state of a user entity within client node 120. A user entity state is deduced based on indications received from client node 120 or from a protocol entity communicating with client node 120 pertaining to the user entity in question. User entity protocol data 114A comprises information on the protocol currently used to communicate towards the user entity in question and information on the protocols available to contact the user entity in client node 120. A given user entity may communicate with communication server 100 using a number of different protocols. An application entity within client node 120 may communicate with communication server 100 and any number of remote nodes such as remote node 152.

A protocol entity may associate a time-to-live parameter with a message. The time-to-live may expressed in terms of time, delivery attempts or a number of hops traversed. A protocol entity may repeatedly try the delivery of a given message.

In one embodiment of the invention, user entity protocol data 114A comprises a static list of protocols which is used in the determination of the preferred protocol.

In one embodiment of the invention, user entity protocol data 114A comprises a dynamic list of protocols used in the determination of the preferred protocol. The dynamic list is altered by communication core entity 110 during the operation of communication core entity 110, based information on successfully used protocols and protocols which have failed to delivered messages. The information on success or failure is obtained, for example, from one of the protocol entities 102, 104 and 106. This means that the order of the protocols in the list may be altered due to protocol successes or failures at any event. In one embodiment of the invention, certain protocols may be skipped in the list or removed from the list due to constant failures.

Figure 2A:
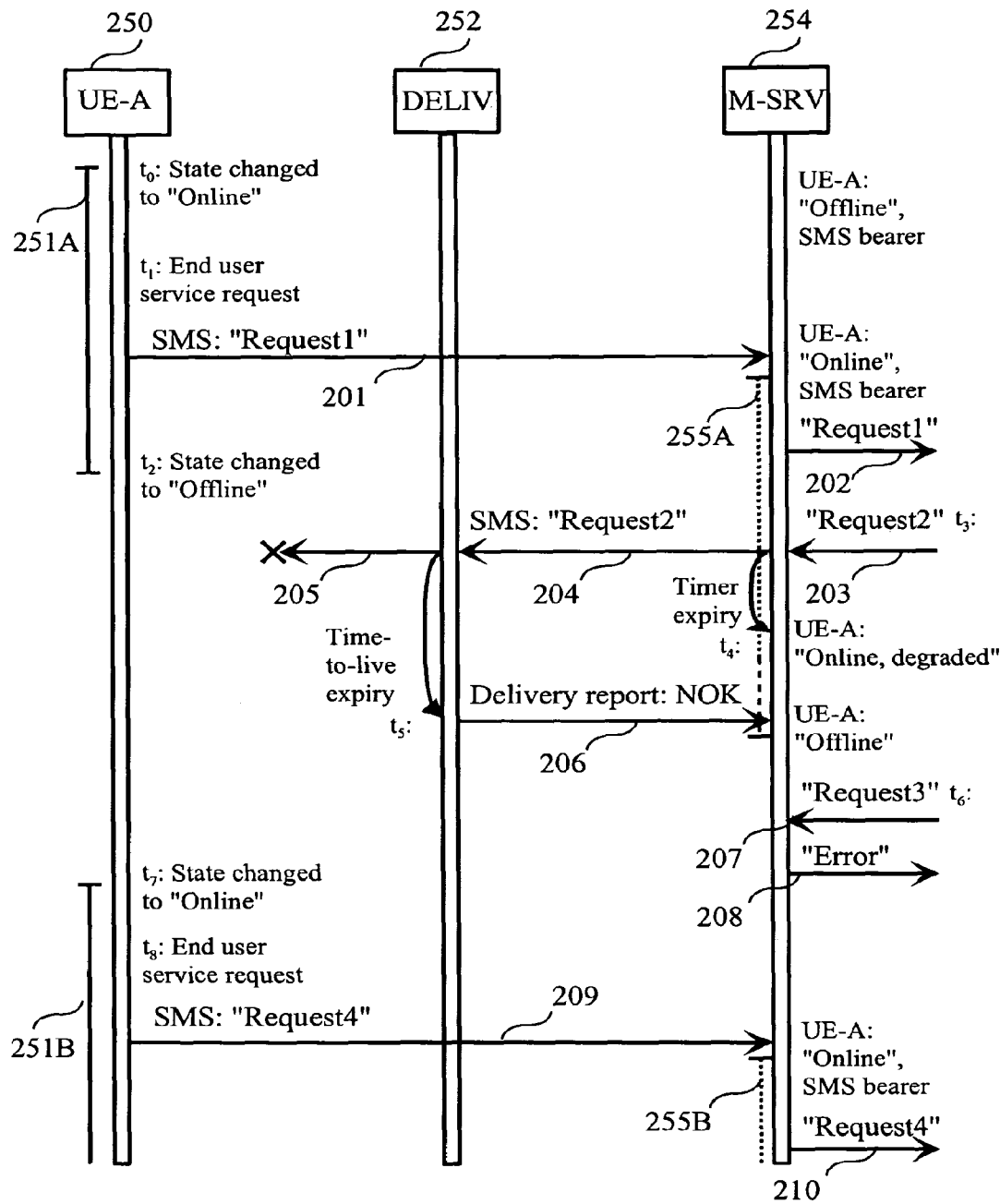
FIG. 2A is a message sequence chart illustrating the mirroring method of a user entity state in one embodiment of the invention.

FIG. 2A is a message sequence chart illustrating the mirroring method of a user entity state in one embodiment of the invention.

In the FIG. 2A there is a user entity 250, a delivery entity 252 and a mobility server 254. Delivery entity 252 may be a protocol entity within mobility server 254 or it may be a separate server between user entity 250 and mobility server 254, or a combination of both a protocol entity and a separate server. Lines 251A and 251B indicate the time when user entity is in online state. Lines 255A and 255B indicate the related online state of the user entity as maintained in mobility server 254. The fact that the state is subordinate to the original state of user entity 250, is illustrated with a dashed line. Dashed line with wider gaps indicates the degraded state. User entity 250 is comprised in a mobile node, for example, client node 120 from FIG. 2. The starting point in FIG. 2A is that the mobile node has registered to a mobile network, which provides for the delivery of messages between user entity 250 and mobility server 254. At time to user entity 250 is activated and its state is changed to online. By the activation is meant, for example, that user entity 250 is actually started or that it is otherwise marked as active in the mobile node. Initially, the related state of user entity 250 within mobility server 254 is marked to be offline. The current bearer recorded in the user entity protocol data in this non-limiting example is SMS due to the temporary unavailability of IP. At time $t_1$ the end user issues a service request. The service request may be, for example, the submission of an instant message or subscription to the presence data of a remote user or a buddy list. User entity 250 issues an SMS comprising a first request to mobility server 254, as illustrated with arrow 201. Upon receiving the SMS, user entity state for user entity 250 is changed to online. The current protocol, in other words, the current bearer remains as the SMS bearer. Mobility server 254 sends the request towards a remote node, as illustrated with arrow 202. At time $t_2$, user entity state for user entity 250 is changed to offline within the mobile node. At time $t_3$ the remote node sends a second request to mobility server 254, as illustrated with arrow 203. The second request is sent from mobility server 254 to delivery entity 252 over SMS, as illustrated with arrow 204. The time-to-live parameter is set by mobility server 254. Delivery entity 252 attempts to deliver the SMS towards user entity 250, as illustrated with arrow 205. The delivery in this example is not successful and the SMS does not reach user entity 250. At time $t_4$, a timer expires in mobility server 254, which indicates the transition to the degraded state for user entity 250. Thus, user entity 250 is set to degraded state in the state data maintained in mobility server 254 for the mobile subscriber of the mobile node. At time $t_5$, the time-to-live timer expires in delivery entity 252. Delivery entity 252 send a delivery report indicating NOT-OK (NOK) status to mobility server 254, as illustrated with arrow 206. As the result, mobility server 254 sets the related state for user entity 250 to offline. At time $t_6$, a third request is received from remote node, as illustrated with arrow 207. Due to the fact that user entity 250 is marked to offline in the mirrored state, an error report is sent back to the remote node, as illustrated with arrow 208. At time $t_7$, user entity 250 is activated and its state is changed to online. However, it should be noted that at this state the user entity state is not reported explicitly to mobility server 254. Instead, user entity 250 waits for a first outbound message. At time $t_8$, the user issues a service request and thus an SMS containing a fourth request is sent to mobility server 254, as illustrated with arrow 209. Upon receiving the SMS, mobility server 254 sets the related state for user entity 250 to online and the current bearer in user entity protocol data to SMS, in this example. The fourth request is sent towards a remote node, as illustrated with arrow 210.

It should be noted that, in one embodiment of the invention, a response to an associated request may use a different protocol which is other than the request, if a protocol switch has occurred between the receiving of a request to a client node and the sending of the response to the request from the client node.

In one embodiment of the invention, a given service request may be transported to a client via multiple transport protocols at an arbitrary order. The related application protocol over the transport protocol may carry a message identifier that is used to filter multiple copies of a given service request so that only the first copy is served and others are just discarded by the application protocol within the application entity or within an application protocol entity comprised in a protocol entity.

Figure 2B:
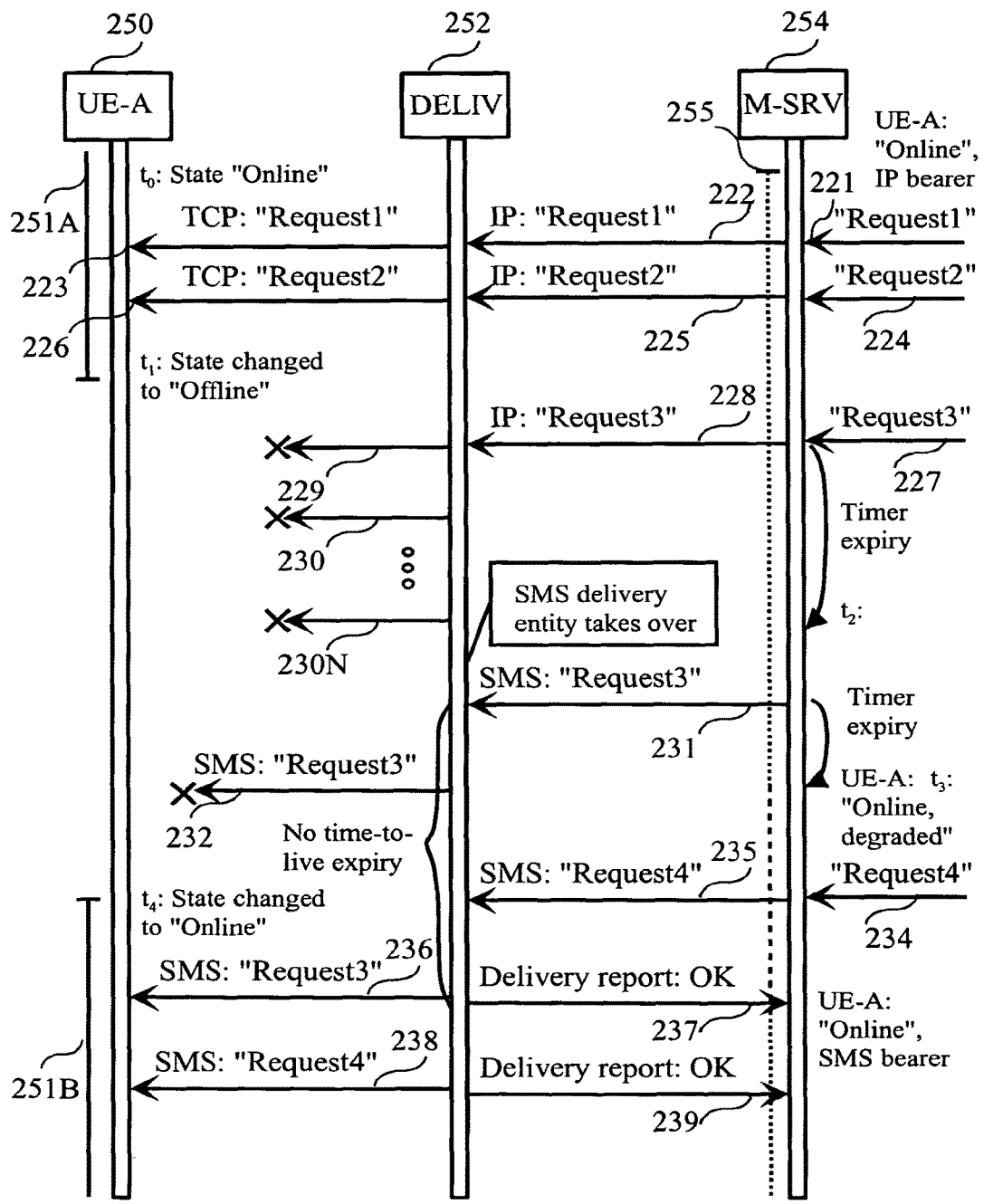
FIG. 2B is a message sequence chart illustrating the downgrading method of preferred protocol and eventual message delivery in one embodiment of the invention.

FIG. 2B is a message sequence chart illustrating the downgrading method of preferred protocol and eventual message delivery in one embodiment of the invention.

In FIG. 2B there is a user entity 250, a delivery entity 252 and a mobility server 254. The online state of user entity 250 is illustrated with lines 251A and 251B. The related state of user entity 250, as maintained by mobility server 254, is illustrated with line 255. The online state 255 is illustrated with denser dashed line, whereas the online state 255 with degraded status is illustrated with a sparser dashing. The starting point in FIG. 2B is that a mobile node comprising user entity 250 is registered to a mobile network and is capable of communication via IP with mobility server 254. The user entity state of user entity 250 in state data within mobility server 254 marked to online and the current bearer in user entity protocol data is TCP. A remote node sends a first request to mobility server 254, as illustrated with arrow 221. Since the current bearer, in other words, the current protocol is TCP, the first request is sent to a TCP delivery entity represented by delivery entity 252 in FIG. 2B. Any other transport protocol over IP may be used instead by delivery entity 252. For example, the delivery entity 252 could also use the UDP. Mobility server 254 sends the first request to delivery entity 252, as illustrated with arrow 222. Delivery entity 252 sends the first request over TCP to user entity 250, as illustrated with arrow 223. It should be noted that in addition to TCP any other transport layer protocol could be used, TCP being only an illustrative example. A second request is sent to mobility server 254, as illustrated with arrow 224. The second request is sent to delivery entity 252 from mobility server 254, as illustrated with arrow 225. The second request is sent over TCP to user entity 250, as illustrated with arrow 226. At time $t_1$ the state of user entity 250 is set to offline. Thereupon, a remote node sends a third request to mobility server 254, as illustrated with arrow 227. At this stage, mobility server 254 does not know the correct state of user entity 250. Thus, the third request is sent to delivery entity 252 for delivery, as illustrated with arrow 228. The delivery of the third request to user entity 250 is unsuccessful, as illustrated with arrow 229. The IP packet may be lost during transmission towards the mobile node, a bearer may not be available in the network for transmitting the IP packet or it may be rejected by the operating system of the mobile node due to the fact that an application entity representing user entity 250 is not active. The delivery of the third request may be attempted a number of times. The attempted deliveries are illustrated with arrows 230 and 230N. Due to the fact that a success report is not received from delivery entity 252 to mobility server 254, a timer expires at time $t_2$. At time $t_2$, mobility server 254 changes the current protocol to a second protocol which in this case is the SMS. Thus, the delivery entity 252 in FIG. 2B is now represented by a different protocol entity from mobility server 254, namely a protocol entity in charge of SMS. Thereupon, mobility server 254 sends the third request again, this time to be delivered via a SMS protocol entity 252. The receiving of the third request to the delivery entity 252 is illustrated with arrow 231. The third request is stored by delivery entity 252 for the time indicated in the time-to-live parameter. The failure to deliver the third request via SMS to user entity 250 is illustrated with arrow 232. At time t3, the related state of user entity 250 is set to online and degraded in response to timer expiry for receiving a delivery success report. Sometime later a remote node sends a fourth request, as illustrated with arrow 234 to mobility server 254. The fourth request is sent from mobility server 254 to delivery entity 252, as illustrated with arrow 235. The fourth request is stored in delivery entity 252. At time $t_4$, the state of user entity 250 is changed to online in the mobile node. Sometime later delivery entity 252 once more attempts the delivery of the third request to user entity 250, as illustrated with arrow 236. The delivery proves to be successful, so a delivery OK report is sent from delivery entity 252 to mobility server 254, as illustrated with arrow 237. In response the related state of user entity 250 is set to online and the current bearer in user entity protocol data remains SMS. Thereupon, delivery entity 252 sends the fourth request via SMS to user entity 250, as illustrated with arrow 238. The delivery report to mobility server 254 is illustrated with arrow 239.

Figure 2C:
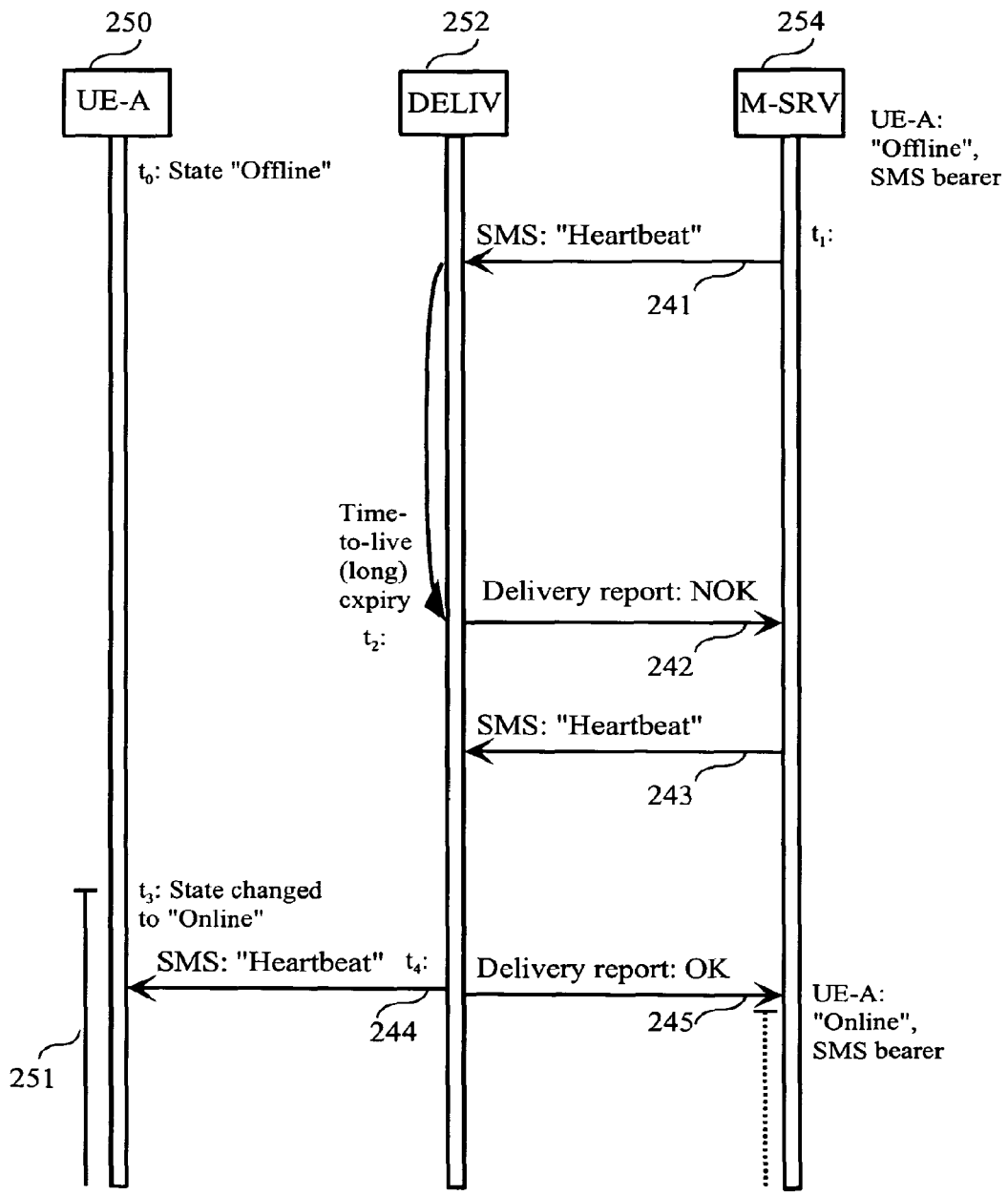
FIG. 2C is a message sequence chart illustrating a user agent activation discovery method in one embodiment of the invention.

FIG. 2C is a message sequence chart illustrating a user agent activation discovery method in one embodiment of the invention.

In FIG. 2C there is a user entity 250, a delivery entity 252 and a mobility server 254. At time $t_0$ the state of user entity 250 is offline. Mobility server 254 also has in its user data the related state set to offline and the current bearer set to SMS, in this example. In FIG. 2C mobility server 254 supervises the state of user entity 250 by way of a heartbeat message. A heartbeat message is a store-and-forward message with a long time-to-live parameter. At time $t_1$ mobility server 254 sends the heartbeat message for delivery via SMS to delivery entity 252, as illustrated with arrow 241, which is in this case a SMS protocol entity. Before time $t_2$, delivery entity 252 may make a number of attempts to deliver the heartbeat message via SMS to user entity 250. At time $t_2$, the time-to-live timer expires. In response a delivery failure (NOK) report is sent from delivery entity 252 to mobility server 254, as illustrated with arrow 242. In one embodiment of the invention, the expiry of the time-to-live timer could occur also in mobility server 254, especially if mobility server 254 contains Short Message Service Center (SMSC) functionality.

Thereupon, mobility server 254 provides a similar heartbeat message for delivery via SMS to delivery entity 252, as illustrated with arrow 243. At time $t_3$, the state of user entity 250 is set to online. At time $t_4$, delivery entity 252 attempts the delivery of an SMS comprising the heartbeat message to user entity 250, as illustrated with arrow 244. Thereafter, a report of successful delivery is indicated from delivery entity 252 to mobility server 254, as illustrated with arrow 245. In response mobility server 254 sets the related user entity state for user entity 250 to online and the current bearer is set to SMS in the protocol data.

Figure 3A:
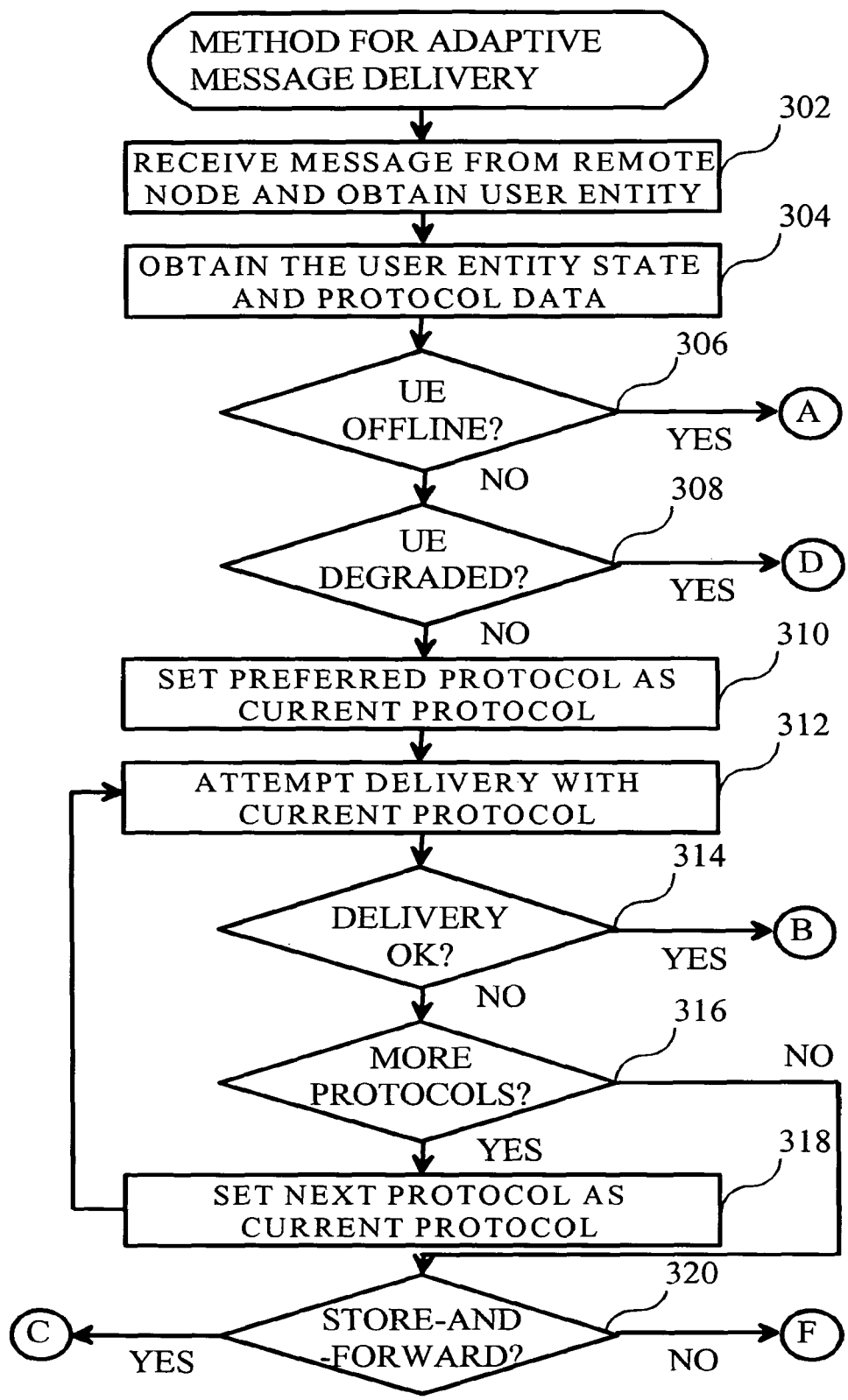
FIG. 3A is a flow chart illustrating a first part of a method for adaptive message delivery in one embodiment of the invention.

FIG. 3A is a flow chart illustrating first part of a method for adaptive message delivery in one embodiment of the invention.

At step 302 a message is received from a remote node to a communication server such as mobility server 254 as illustrated in FIGS. 2A, 2B and 2C. The communication server obtains the destination user identity from the message.

At step 304 the communication server obtains the user entity state and protocol data using the user identity. If there are several user entities for the user identified, a correct user entity is selected from the user entities stored in the communication server for the user. Within the user entity data structure, the user entity state is a related user entity state and protocol data comprises the current protocol and the protocol prioritization. There may also be trigger rules in the protocol data.

At step 306 communication server checks if user entity is offline. If the user entity is offline, the method continues at the step indicated with label A. If the user entity is not offline, the method continues at step 308.

At step 308 it is checked if the state of the user entity is online but degraded. If this is the case, the method continues at the step labeled with letter D. If this was not the case, the method continues at step 310.

At step 310 a preferred protocol from the protocol data is set as the current protocol. The preferred protocol may be determined with trigger rules.

At step 312 the delivery of the message is attempted with the current protocol. The delivery may be attempted several times as illustrated in FIG. 2B.

At step 314 it is determined whether the delivery was successful. If the delivery was successful, the method continues at the step labeled with letter B. If the delivery was not successful, the method continues at step 316.

At step 316 it is determined whether there are more protocols with direct delivery without a store-and-forward mechanism. If there are more direct delivery protocols, the method continues at step 318. If there no such protocols, the method continues at step 320.

At step 318 the next protocol in the precedence order is set as the current protocol and thereafter the method continues at step 312.

At step 320 it is determined whether a store-and-forward protocol is defined as the final protocol. If a store-and-forward protocol is allowed that is defined as the last delivery mechanism the method continues at the step labeled with letter C. Otherwise the method continues at step labeled with letter F.

Figure 3B:
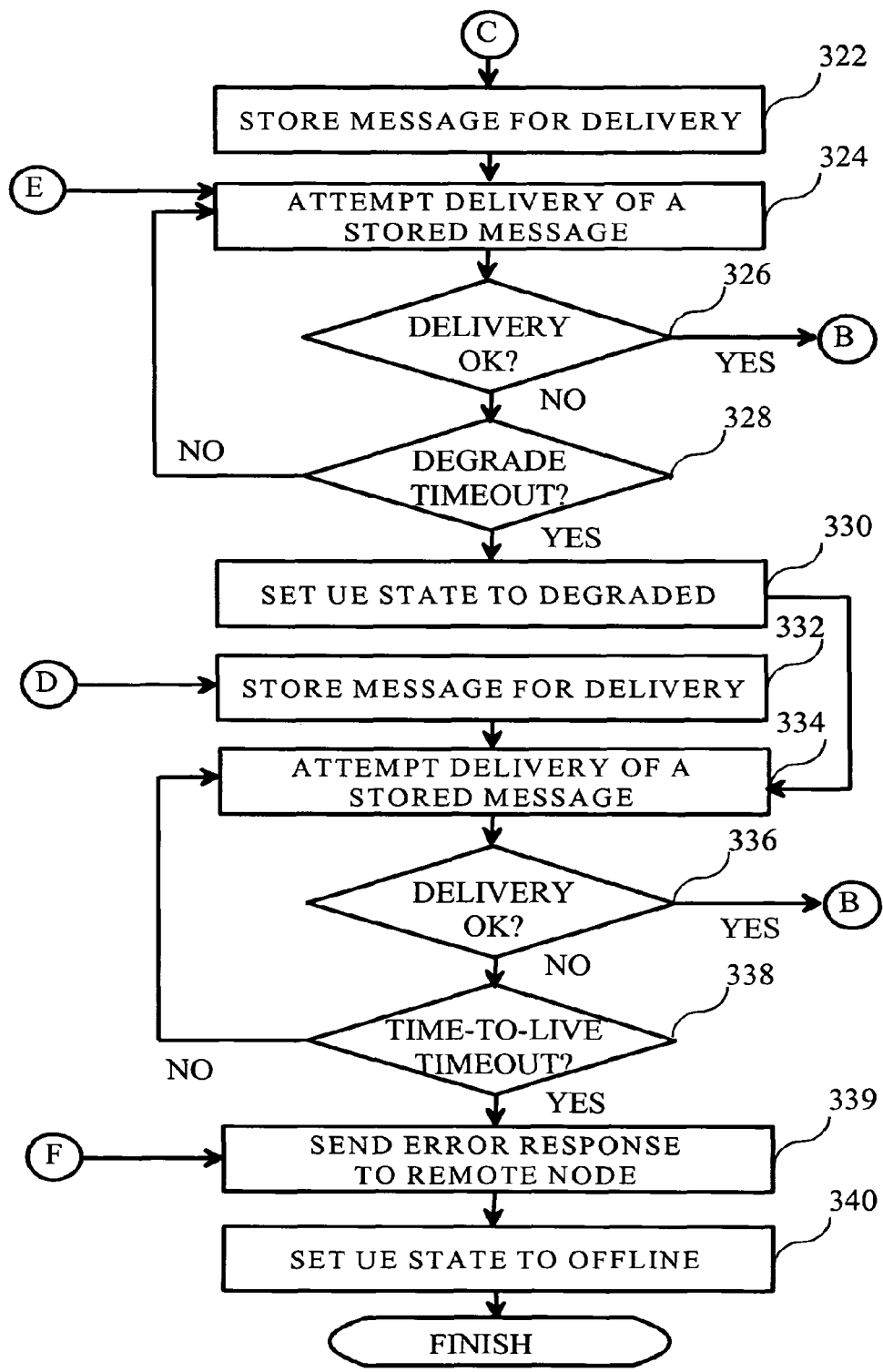
FIG. 3B is a flow chart illustrating a second part of a method for adaptive message delivery in one embodiment of the invention.

FIG. 3B is a flow chart illustrating a second part of a method for adaptive message delivery in one embodiment of the invention.

At step 322, which is also labeled with letter C, the message is stored for delivery.

At step 324, which is also labeled with letter E, a delivery of a stored message is attempted. By a delivery attempt is in this case meant an active message transmission attempt or the waiting for of an indication which indicates that the message may now be successfully delivered and the subsequent delivery of a message.

At step 326 it is determined whether the delivery of a stored message was successful. If the delivery was successful, the method continues at the step labeled with letter B. Otherwise, the method continues at step 328.

At step 328 it is determined whether a degraded timer has expired. If the timer has not expired the method continues at step 324. If the timer has expired the method continues at step 330.

At step 330 the user entity state is set to online and degraded in the communication server. Thereupon, the method continues at step 334.

At step 332, which is also labeled with letter D, the message earlier received from the remote node is stored for delivery. The message is stored in a delivery buffer, which may also contain other earlier messages.

At step 334 the delivery of a stored message is attempted. The message whose delivery is attempted is taken from the buffer of stored messages and it is not necessarily the most recent message received from the remote node.

At step 336 it is determined whether the delivery was successful. If the delivery was successful the method continues at the step labeled with letter B. Otherwise, the method continues at step 338.

At step 338 it is determined whether the time-to-live timer has expired for a stored message. If the time-to-live timer has expired, the method continues at step 340. Otherwise, the method continues at step 334. The timer expiry handling for the other buffered messages is not illustrated herein, since the user entity state transition to offline has already occurred.

At step 339, also labeled with letter F, an error response is sent to the remote node that sent the message.

At step 340 the user entity state is set to offline by the communication server.

In one embodiment of the invention, all the user entities of a given user may be set to offline related state in the communication server when the delivery of a message using a given protocol fails. Similarly, in one embodiment of the invention, all the user entities of a given user may be set to online related state in the communication server when the delivery of a message using a given protocol succeeds no matter what user entity the message was related to.

Figure 3C:
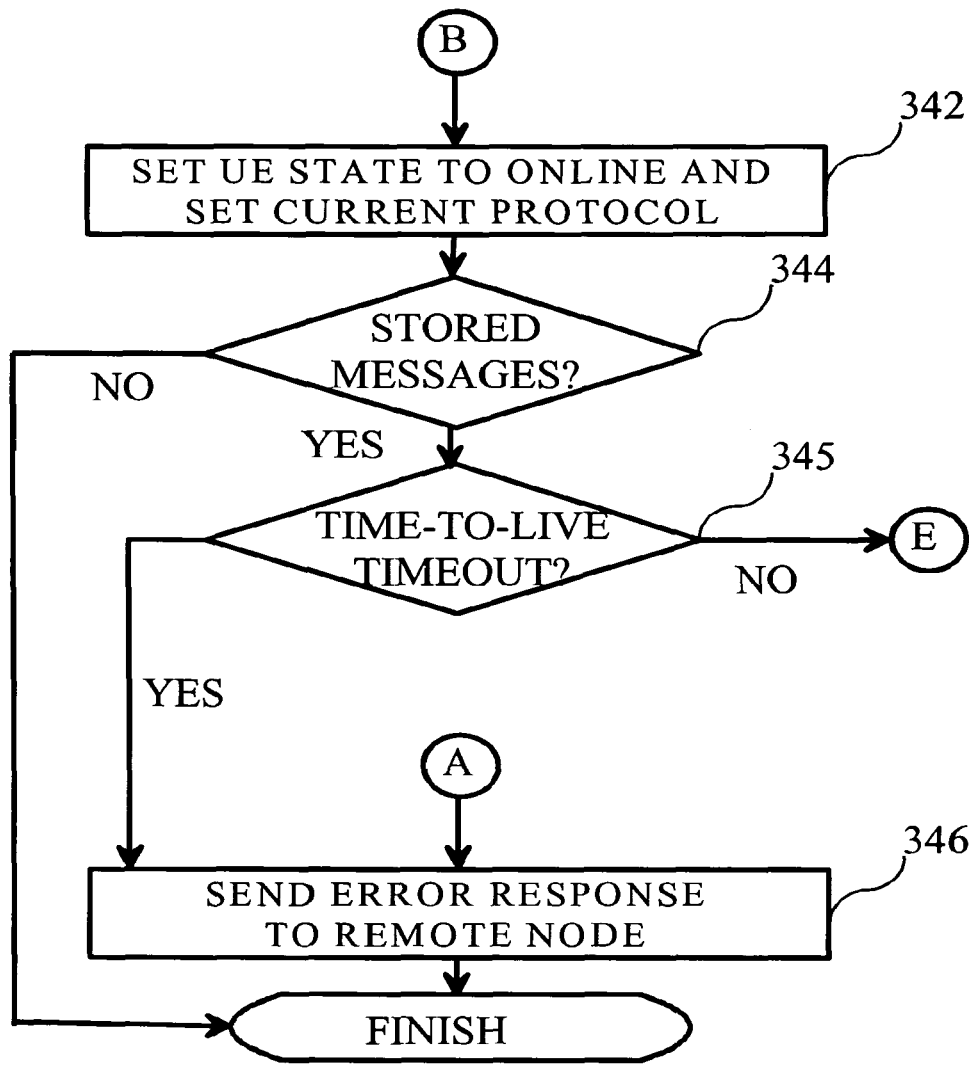
FIG. 3C is a flow chart illustrating a third part of a method for adaptive message delivery in one embodiment of the invention.

FIG. 3C is a flow chart illustrating a third part of a method for adaptive message delivery in one embodiment of the invention.

At step 342 also labeled with letter B, the user entity state is set to online. The current protocol may be set according to the trigger rules for the user entity or remain the one via which the delivery was successful. If the precedence order indicates so, a direct delivery protocol may be selected as the current protocol. The current protocol may also be set to the store-and-forward protocol. If the delivery was successful only after first attempting a direct delivery protocol and then falling back to a store-and-forward protocol the current protocol may be set to the store-and-forward protocol used.

At step 344 it is checked if there are any stored messages for delivery. If there are stored messages, the method continues at step labeled with letter E. It should be noted that there may not be stored messages if a direct delivery protocol was used. If there are no stored messages the delivery which is pending the method is finished.

At step 345 it is determined whether the time-to-live timer has expired for a stored message. If the time-to-live timer has expired, the method continues at step 346. Otherwise, the method continues at the step labeled with letter E.

At step 346 labeled also with letter A an error response is sent to the remote node which sent the message. Thereupon the method is finished.

Figure 4:
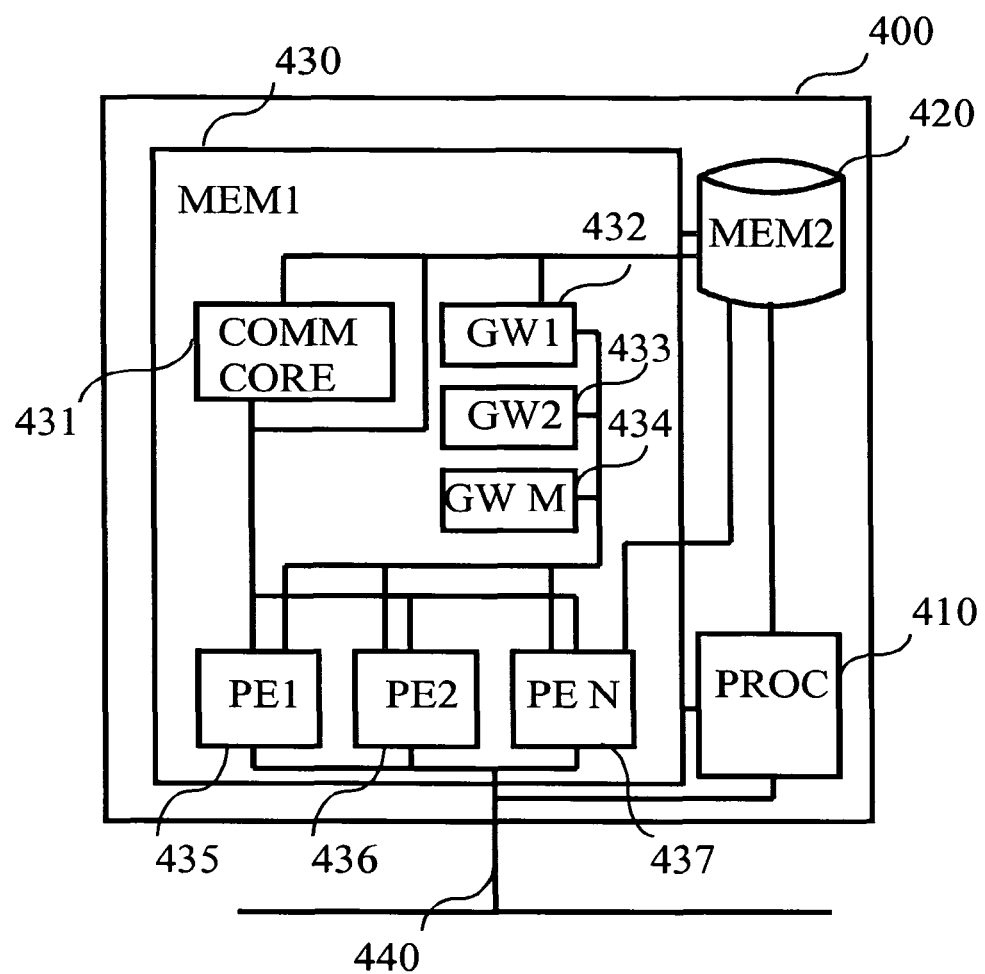
FIG. 4 is a block diagram illustrating a network node in one embodiment of the invention.

FIG. 4 is a block diagram illustrating a network node in one embodiment of the invention.

In FIG. 4 there is illustrated a network node 400. Network node 400 comprises a processor 410, a secondary memory 420 and a primary memory 430. Network node 400 may also comprise any number of other processors and any number secondary memory units. There may also be other primary memories with separate address spaces. Network node 400 comprises also a network interface 440. Processor 410 executes a number of software entities stored at least partly in primary memory 430. Primary memory 430 comprises a communication core entity 431, a gateway entity 432, a gateway 433 and a gateway entity 434. Primary memory 430 comprises also a protocol entity 435, a protocol entity 436 and a protocol entity 437. There may be any number of gateway entities as illustrated with the letter M, which stands for an arbitrary natural number. There may also be any number of protocol entities as illustrated with the letter N, which stands for an arbitrary natural number independent of M. The communication core entity 431 comprises a number of user entries. Within a user entry there is a number of application entries. An application entry in term comprises user entity state information and protocol data information. Network node 400 can also include a display and a user interface.

In one embodiment of the invention, part of protocol entities 435, 436 and 437 are comprised in the operating system of network node 400. The entities within network node 400 in FIG. 4, may be implemented in a variety of ways. They may be implemented as processes executed under the native operating system of the network node. The entities may be implemented as separate processes or threads or so that a number of different entities are implemented by means of one process or thread. A process or a thread may be the instance of a program block comprising a number of routines, that is, for example, procedures and functions. The entities may be implemented as separate computer programs or as a single computer program comprising several routines or functions implementing the entities. The program blocks are stored on at least one computer readable medium such as, for example, a memory circuit, a memory card, a holographic memory, magnetic or optic disk. Some entities may be implemented as program modules linked to another entity. The entities in FIG. 4 may also be stored in separate memories and executed by separate processors, which communicate, for example, via a message bus or an internal network within the network node. An example of such a message bus is the Peripheral Component Interconnect (PCI) bus. The internal network may be, for example, a local area network. The entities may also be partly or entirely implemented as hardware, such as ASICS or FPGAs.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method comprising:
   receiving, from a node, a message and user information with recipient information associated with said message, said user information comprising user entity protocol information;
   determining a prioritization of a plurality of protocols based on said user entity protocol information;
   selecting a first protocol based on the prioritization of the plurality of protocols;
   causing delivery of said message to be attempted with a delivery mechanism of said first protocol;
   selecting a second protocol based on the prioritization of the plurality of protocols upon a failure to deliver said message with said first protocol;
   causing the delivery of said message to be attempted with a delivery mechanism of the second protocol; and
   upon determining that a user entity state is offline:
      attempting delivery of a second message;
      in response to receiving a delivery failure report, continuing to attempt delivery of the second message; and
      in response to receiving a delivery success report, setting said user entity state to online.

2. The method according to claim 1, the method further comprising:
   associating said message with a time-to-live parameter;
   detecting a failure to deliver said message with said second protocol;
   detecting the expiry of the value of said time-to-live parameter; and
   setting said user entity state to offline.

3. The method according to claim 1, the method further comprising:
   receiving a message from a mobile node, the message produced by a user entity within the mobile node, the user entity activated by a user; and
   setting said user entity state to online in response to detecting that said message originates from said user entity.

4. The method according to claim 1, the method further comprising:
   starting a degrade timer upon a failure to deliver said message;
   checking the success of the delivery of said message;
   setting said user entity state to degraded upon the expiry of said degrade timer; and
   imposing a limit on delivery attempts for messages to a user entity in response to said user entity state being degraded.

5. The method according to claim 1, wherein said plurality of protocols comprise at least one of a Transmission Control Protocol, a User Datagram Protocol or a Stream Control Transmission Protocol.

6. The method according to claim 1, wherein said second protocol comprises the Short Message Service or the Unstructured Supplementary Service Data.

7. The method according to claim 1, the method further comprising:
   delivering said message using said second protocol to a mobile node; and
   receiving from said mobile node a response to said message using said first protocol, the response sent upon a detection by the mobile node that the first protocol is available.

8. The method according to claim 1, wherein said selecting a first protocol further depends on at least one of the size of said message, the urgency of said message or at least one security requirement for said message.

9. The method according to claim 1, further comprising changing the prioritization of the plurality of protocols based on protocol successes or failures.

10. The method according to claim 1, further comprising removing a protocol from the plurality of protocols included in the prioritization of the plurality of protocols based on a plurality of failures of the protocol.

11. A communication server configured to:
   receive a message from a node;
   obtain user information with recipient information in said message, said user information comprising a user entity state and user entity protocol information;
   determine, based on said user entity protocol information, a prioritization of a plurality of protocols;
   select a first protocol based on the prioritization of the plurality of protocols;
   cause the delivery of said message to be attempted with a delivery mechanism of said first protocol;
   select a second protocol based on the prioritization of the plurality of protocols upon a failure to deliver said message with said first protocol;
   cause the delivery of said message to be attempted with a delivery mechanism of said second protocol; and
   upon determining that a user entity state is offline:
      attempt delivery of a second message;
      in response to receiving a delivery failure report, continue to attempt delivery of the second message; and
      in response to receiving a delivery success report, set said user entity state to online.

12. The communication server according to claim 11, the communication server further configured to:
   associate with said message a time-to-live parameter and to set said user entity state to offline;
   detect a failure to deliver said message with said second protocol; and
   to detect the expiry of the value of said time-to-live parameter.

13. The communication server according to claim 11, the communication server further configured to
- start a degrade timer upon a failure to deliver said message;
- check the success of the delivery of said message;
- set said user entity state to degraded upon the expiry of said degrade timer; and
- to impose a limit on delivery attempts for messages to a user entity in response to said user entity state being degraded.

14. The communication server according to claim 11, wherein said first protocol comprises at least one of a Transmission Control Protocol, a User Datagram Protocol or a Stream Control Transmission Protocol.

15. The communication server according to claim 11, wherein said second protocol comprises the Short Message Service or the Unstructured Supplementary Service Data.

16. The communication server according to claim 11, wherein said selecting a first protocol depends on at least one of the size of said message, the urgency of said message or at least one security requirement for said message.

17. A tangible non-transitory computer readable medium embodying code configured to control at least one processor to:
- receive a message from a node;
- obtain user information with recipient information associated with said message, said user information comprising user entity protocol information;
- determine, based on said user entity protocol information, a prioritization of a plurality of protocols;
- select a first protocol based on the prioritization of the plurality of protocols;
- cause delivery of said message to be attempted with a delivery mechanism of said first protocol;
- select a second protocol based on the prioritization of the plurality of protocols upon a failure to deliver said message with said first protocol;
- cause delivery of said message to be attempted with a delivery mechanism of said second protocol; and
- upon determining that a user entity state is offline:
    - attempt delivery of a second message;
    - in response to receiving a delivery failure report, continue to attempt delivery of the second message; and
    - in response to receiving a delivery success report, set said user entity state to online.

* * * * *